United States Patent
Lusti et al.

(10) Patent No.: US 11,027,340 B2
(45) Date of Patent: Jun. 8, 2021

(54) MILLING HEAD WITH CONSTANT PROFILES

(71) Applicant: Friedrich Gloor AG, Lengnau (CH)

(72) Inventors: Hanspeter Lusti, Lengnau (CH); Daniel Flury, Lommiswil (CH)

(73) Assignee: FRIEDRICH GLOOR AG, Lengnau (CH)

( * ) Notice: Subject to any disclaimer, the term of this patent is extended or adjusted under 35 U.S.C. 154(b) by 65 days.

(21) Appl. No.: 16/349,750

(22) PCT Filed: Nov. 21, 2017

(86) PCT No.: PCT/EP2017/079955
§ 371 (c)(1),
(2) Date: May 14, 2019

(87) PCT Pub. No.: WO2018/091744
PCT Pub. Date: May 24, 2018

(65) Prior Publication Data
US 2020/0070257 A1     Mar. 5, 2020

(30) Foreign Application Priority Data
Nov. 21, 2016   (EP) ..................... 16199874

(51) Int. Cl.
*B23C 5/12*   (2006.01)
*B23C 5/08*   (2006.01)

(52) U.S. Cl.
CPC .................. *B23C 5/08* (2013.01); *B23C 5/12* (2013.01); *B23C 2210/282* (2013.01)

(58) Field of Classification Search
CPC ........ B23C 5/08; B23C 5/12; B23C 2210/282
See application file for complete search history.

(56) References Cited

U.S. PATENT DOCUMENTS

2014/0010606 A1* 1/2014 Sagstrom .............. B23F 21/166
407/51

FOREIGN PATENT DOCUMENTS

| FR | 678321 A | 3/1930 | |
| WO | 2003053617 | 7/2003 | |
| WO | WO-2007097685 A1 * | 8/2007 | ............... B23C 5/10 |

OTHER PUBLICATIONS

International Search Report and Written Opinion in PCT/EP2017/079955 dated Feb. 26, 2018, 11 pages.

* cited by examiner

*Primary Examiner* — Alan Snyder
(74) *Attorney, Agent, or Firm* — Pearne & Gordon LLP

(57) ABSTRACT

Proposed in a milling head, which has a plurality of machining milling teeth and tooth gaps arranged therebetween, whereby the milling teeth and the tooth gaps are arranged along a circumferential surface of the milling head, which milling head is to be provided with a number of milling teeth, which is greater than and/or substantially equal to the number of milling teeth ascertained using the equation $y = a \cdot x^5 + b \cdot x^4 + c \cdot x^3 + d \cdot x^2 + e \cdot x + f$, wherein x is the diameter of the milling head in millimeters and y is the tooth pitch, i.e. the distance between two adjacent milling teeth in millimeters, and it substantially applies that the value of a ranges between $a = 1.7 \cdot 10^{-9}$ and $a = 2.3 \cdot 10^{-9}$, the value of b between $b = -5 \cdot 10^{-7}$ and $b = -11 \cdot 10^{-7}$, the value of c between $c = 0.7 \cdot 10^{-4}$ and $c = 1.3 \cdot 10^{-4}$, the value of d between $d = 8.5 \cdot 10^{-3}$ and $d = 9.7 \cdot 10^{-3}$, the value of e between $e = 2.6 \cdot 10^{-1}$ and $e = 3.7 \cdot 10^{-1}$ and the value of f between $f = -1.5 \cdot 10^{-1}$ and $f = -2.6 \cdot 10^{-1}$.

17 Claims, 3 Drawing Sheets

MILLING HEAD WITH CONSTANT PROFILES

TECHNICAL FIELD OF THE INVENTION

The invention relates to a milling head with a plurality of machining milling teeth and tooth gaps arranged there-between, which are arranged along a circumferential surface of the milling head.

STATE OF THE ART

In a material-removing machining of workpieces, milling is a conventional standard method. It is used in the machining of diverse materials, such as, for example, wood, plastic and metal. Used thereby are usually fast rotating milling heads whereby either the workpiece is moved past them (stationary milling head) or which are moved past a rigidly clamped workpiece. The speed of the relative movement of milling head as "entire component" and workpiece is thereby comparatively low, in particular if metals are being machined. With metals there are typically speeds in the range of millimeters per minute (mm/min) up to meters per minute (m/min). The rotational speed of the milling head is in contrast significantly higher and often lies in the range of 1 000 rpm (in the case of bigger milling heads, for example of 80 mm diameter) up to 10 000 rpm (in the case of smaller milling heads, for example of 10 mm diameter) and if necessary even higher.

One advantage of milling is in particular that the milling head can be designed with a shaped material-removing surface (shape of the cutting tooth). The workpiece to be machined can thereby be given a certain desired surface design during the machining process.

The so-called form milling or shaped work continues to be common in which a surface to be given a special shape and to be formed through material removal is machined with a non-structured milling head, and the shape is achieved through a suitable two-dimensional transverse movement of the milling head relative to the piece to be machined.

Of course it is desirable to achieve as high as possible machining speeds (relative movement between milling head and workpiece and thereby machined edge length or feed size per unit of time). In principal, there is the problem that the faster the feed rate (with rotational speed of the milling head remaining the same), the greater the tendency toward burr formation and all the more likelihood of surface roughness. Starting at certain movement speeds, a mechanical overload of the milling cutter also arises, as the case may be also a jamming of the milling cutter, which typically has as a consequence damage to the milling head and/or workpiece.

Also an increase of the rotational speed has of course limits, in particular in view of the strength of the materials used. Accordingly a compromise between as quick a workpiece production as possible and sufficiently high surface quality is to be found.

Of course sought is to increase machining speed with workpiece surface quality nevertheless remaining the same.

This wish is to be fulfilled in particular under the general condition of achieving a service life (i.e. life of the milling head) as high as possible.

DISCLOSURE OF INVENTION

Accordingly the invention has as object to improve a milling head with a plurality of machining milling teeth and tooth gaps arranged there-between, which are arranged along a circumferential surface of the milling head, to the effect that this milling head has improved features with respect to milling heads of this kind known in the state of the art.

The invention attains this object.

Proposed is to design a milling head with a plurality of machining milling teeth and tooth gaps arranged there-between, which are arranged along a circumferential surface of the milling head, in such a way that the number of milling teeth is greater than and/or substantially equal to the number of milling teeth ascertained using the equation $y = a \cdot x^5 + b \cdot x^4 + c \cdot x^3 + d \cdot x^2 + e \cdot x + f$, wherein x is the diameter of the milling head in millimeters and y is the tooth pitch, i.e. the distance between two milling teeth situated adjacent to one another, in millimeters, and it substantially applies that $a = 2 \cdot 10^{-9}$, $b = -8 \cdot 10^{-7}$, $c = 1 \cdot 10^{-4}$, $d = 9.1 \cdot 10^{-3}$, $e = 3.145 \cdot 10^{-1}$ and $f = -2.062 \cdot 10^{-1}$. Thus for the number of milling teeth, "greater" as well as "substantially equal" can apply alone. Above and beyond this, also the combination, i.e. a "greater or substantially equal" or respectively a "greater or equal" can apply. Here too one could also speak of a "greater than or equal" or the like. Correspondingly, "lesser", "substantially equal", "lesser or substantially equal", "lesser or equal" or respectively "lesser than or equal" or the like can apply for the tooth pitch. One could also express these relationships in the form of a formula, in particular as $y \leq a \cdot x^5 + b \cdot x^4 + c \cdot x^3 + d \cdot x^2 + e \cdot x + f$ or respectively as $y < a \cdot x^5 + b \cdot x^4 + c \cdot x^3 + d \cdot x^2 + e \cdot x + f$. "Milling teeth situated adjacent to one another" thereby refers to milling teeth which are situated adjacent to one another along the circumferential direction of the milling head, i.e. in a manner of speaking "one after the other". Thereby measured is the distance to areas of respectively the same kind of the milling teeth situated adjacent to one another, i.e. for example the spacing to the respective leading edge of the milling teeth situated adjacent to one another (measured here in each case in millimeters).

The inventors have recognized that the limiting operation is the relative feed between milling head and workpiece per removal operation. A removal operation thereby takes place, as a rule, by means of a salient milling tooth, in particular in the region of the cutting edge of the leading edge of the respective milling tooth. A typical value therefor is the feed rate per cutting operation, i.e. the feed rate which in each case occurs in the time between the passing of two milling teeth (with substantially constant forward speed). This varies within relatively broad limits, in particular depending upon the material. Especially in metal machining, values in the range of 10 µm to 30 µm are rather typical (which is known in principle). Accordingly, with the radius of the milling head remaining the same and with rotational speed of the milling head remaining the same, the feed rate of the milling head per unit of time can be increased if the number of milling teeth is increased. In such a case, with the increase in milling teeth comes an increase in milling operations per rotation of the milling head. To give an example: With a milling head of 50 mm diameter and a feed rate per cutting operation of 0.03 mm, the tolerable feed per rotation of the milling head with 12 teeth amounts to 0.36 mm, with 48 teeth, on the other hand, 1.44 mm. Accordingly it is obvious to increase the number of milling teeth, as far as possible. The problem here, however, is that with the increase in number of teeth, disadvantageous effects are also involved. Thus a resharpening and/or relief grinding of the milling head, which is necessary at regular intervals owing to the wear and tear on the tool, becomes significantly more complex and costly since there is a greater number of teeth to grind or sharpen (resharpen and/or relief grind). Resharpening refers typically to a sharpening of the cutting edges, whereas relief grinding typically refers to a "restoration of the desired course of the profile." Merely for the sake of completeness, it is pointed out that a resharpening, as a rule, is to be carried out more frequently than a relief grinding. Thus there exists an upper limit for the number of teeth, which may not, or at least not practicably, be exceeded (at least this has been the prevailing point of view so far).

The problem exists however not just with respect to additional effort and cost involved with a large number of teeth, but also with respect to the tools used. If the milling head and/or the grinding wheel is dimensioned to be very small, in particular in the case of a milling head with a shaped profile (i.e. a milling head which has a certain surface design that is transferred to the workpiece to be machined), further disadvantageous effects arise in the context of a resharpening operation/profile grinding operation. Thus, as a rule, it is necessary (at least practicable) that the grinding wheel (i.e. the tool with which the milling head is resharpened/profile ground) is not guided (or not only guided) transversely to the teeth (the rotational axis of the grinding wheel is thus perpendicular to the rotational axis of the milling head), but instead the so-called resharpening operation (part of the so-called resharpening operation) takes place in such a way that the rotational axis of the grinding wheel and the rotational axis of the milling head run at least substantially parallel to one another. The advantage thereby is that in this case the grinding wheel, which can be used for resharpening and/or profile grinding of the milling head, can also be provided with a contour, so that an especially simple and practicable resharpening and/or profile grinding, in particular of form milling heads, is possible. Thereby used as grinding wheel can preferably be a pointed profile grinding wheel. For the sake of completeness, it is pointed out that both with a guiding of milling head and grinding wheel transversely to one another and with a guiding of milling head and grinding wheel with rotational axes parallel to one another, divergent angular positions can also be used. Thus (especially in the case of grinding wheel and milling head disposed transversely to one another) angular positions can be used in which the rotational axis of the milling head (approximately) lies in the (extended imaginary) plane of the grinding wheel; a significant divergence therefrom is also conceivable, however. Also a configuration in which the grinding wheel and milling head situated parallel to one another are tilted relative to one another (so that therefore the rotational axes of grinding wheel and milling head enclose an angle with respect to one another, whereby they in their extension (approximately) intersect at a certain point) is conceivable in the context of a resharpening operation/profile grinding operation and often expedient. Also a skewed position of rotational axis of the grinding wheel and rotational axis of the milling head is conceivable in this context. Since the grinding wheel cannot or respectively should not be selected to be too small and/or too thin, there results a certain minimal spacing of the teeth of the milling head (minimal value for the tooth pitch), which may not be or may not practicably be, exceeded—and thus there results a corresponding upper limit for the number of teeth of the milling head. Also playing a role here is that the diameter of the grinding wheel must be selected based on certain compromise considerations. If an especially small diameter of the grinding wheel is selected, on the one hand the removal capacity is more minimal (which further increases the time invested in a resharpening operation and/or profile grinding operation), on the other hand the service life of the grinding wheel decreases so that this wheel accordingly has to be often replaced. In turn, an especially large dimensioning of the grinding wheel would lead to a correspondingly large spacing of the milling teeth with respect to one another, which accordingly would reduce the possible number of teeth of the milling head. The opposing interdependent conditions are profoundly complex. Accordingly a multitude of proposals have been made, which continue to be not optimal and are mostly based on rough estimates, empirical data and technical opinions. In particular in the case of milling heads with rather unusual diameters, this leads to disadvantageous tooth numbers continuing to be used for the milling head.

The inventors have figured out that with a milling head that is designed using the formula now proposed and using the coefficients now proposed (i.e. in particular tooth pitch of the milling head the same, lesser or lesser than or equal to, or respectively number of teeth of the milling head the same, greater or greater than or equal to, than directly indicated using the formula), a surprisingly good compromise between the most diverse parameters can be achieved, which leads to an especially efficient milling head which is economical to operate, but is also economical with respect to its procurement and its maintenance and also advantageous otherwise (such as, for example, with respect to the machining quality of workpieces). An especially advantageous milling head, which represents a kind of optimum, results if the now mentioned coefficients of the mentioned formula (fifth-degree polynomial) are used. Of course it is possible that certain tolerances with respect to the coefficients could arise; in particular it is also possible that the constants could vary within certain limits, as will be further explained and proposed in the following. It is also possible to maintain a certain "safety clearance" for the tooth pitch, which is directly indicated by the formula. In particular it is conceivable to provide for a "safety clearance" of 0%, 5%, 10%, 15%, 20%, 25%, 30%, 35%, 40%, 45% or 50% reduction of the tooth pitch (i.e. reduction in spacing apart from one another of two adjacent milling teeth by the respectively mentioned percentage values) than indicated directly by the formula. The number of teeth of the milling head thereby increases correspondingly. Alternatively it could also be devised to the effect that the formula (fifth-degree polynomial) is divided by a factor ("safety factor"), which in the present case would amount to 1.0, 1.05, 1.1, 1.15, 1.2, 1.25, 1.3, 1.35, 1.4, 1.45 or respectively 1.5. This preferably applies if the tooth pitch in real terms on the milling head is lesser, or lesser or equal to, the calculated tooth pitch; if applicable, this also applies however to the case of the "same" (if applicable, with rounding off). The formula used here can be used not merely as "upper limit for the tooth pitch" or respectively "indication of value for the tooth pitch". It is also of course conceivable that the formula is used in particular additionally as "upper limit for the tooth pitch" (and thereby as "lower limit for the number of teeth of the milling head") so that a certain range results. Conceivable as "lower limit factor" by which the formula is divided are in particular 1.1, 1.2, 1.3, 1.4, 1.5, 1.75, 2.0, 2.5, 3.0, 4.0 or 5.0 (the alternative formulation using percentage indications results correspondingly).

With the above-mentioned diameter of the milling head in millimeters, with use of the formula (as well as further required calculations), there results typically a non-integer number for the number of teeth for the milling head. It is thereby possible for the number resulting (directly) to be rounded down and/or rounded up and/or rounded off in accordance with commercial practice. This can be written as a formula, for example, by means of MOD function, or by means of floor or respectively ceiling function (in particular for a formula suitably modified, from which the number of teeth of the milling head directly results). To give an example: if one puts a diameter of 50 mm for the milling head into the "basic formula with basic coefficients", there results a number of teeth of 46.3938. Thus there results with the selected diameter of 50 mm (corresponding to a circumference of 157.08 mm) a tooth pitch for the milling head of 3.39 mm (number of teeth=circumference/tooth pitch, whereby the units naturally have to be selected in a way suiting one another). Accordingly the milling head can have (exactly) 46 or 47, but also greater than or equal to 46 or 47, as well as more than 46 or 47 teeth (=greater) (if need be, even multiplication by a factor, as proposed above). By the way, it often makes sense to use the upper value in each case. Understood by a diameter can be both the outer diameter (measured as maximal diameter in the region of the milling teeth), in the case of varying milling teeth with varying protrusion length, in particular in the case of so-called profile-constant or respectively logarithmic milling heads, also the smallest diameter in the region of the milling teeth, but also a value lying in between, such as in particular the mean value between maximal milling tooth diameter and the minimal milling tooth diameter (or another intermediate value).

It is likewise possible that used for the definition (instead of the measurements in the region of the milling teeth) is the diameter in the region of the tooth gaps (in particular also minimal minor diameter, maximal minor diameter or also a value lying in between, such as in particular the average diameter value in the region of the tooth gaps or respectively the average minor diameter). The minor diameter represents effectively the diameter of the milling head "without teeth" (at the tooth root surface). Above and beyond this it is also possible to take another mean value, such as, in particular, an mean value from the maximal/minimal/average milling tooth diameter and maximal/minimal/average minor diameter of the milling head. Of course other, user-defined diameter definitions known in the state of the art, in particular typically used diameter definitions, are also usable.

A big advantage of the formula proposed here also consists moreover in that henceforth an optimization with respect to the milling head diameter can be carried out in an especially easy way. Thus, for example, a certain number of teeth can be predefined for the milling head (or however also a certain tooth pitch of the milling head can be predefined) and an optimal diameter of the milling head can be determined with the aid of the formula. This applies in particular when (not necessarily only when) one wishes to determine a limit range for the permissible tooth number for the milling head or respectively for the tooth pitch of the milling head (according to the proposed fifth-degree polynomial). Of course a mutual influence is also conceivable. Thus it is of course absolutely possible (and also often makes sense) that one calculates, for example starting from a desired milling head diameter (a desired range of the milling head diameter), an optimal value for the tooth pitch and/or an optimal number of milling teeth of the milling head. In particular the optimal number of milling teeth is typically a non-integer value. Now this value can be rounded (rounded up/rounded down/rounded based on commercial practice), and thereby come to a whole number for the number of teeth of the milling head and, based on this optimal number of teeth for the milling head, can determine an optimal diameter for the milling head. Typically this has as a consequence only a comparatively minimal change in the milling head diameter, which typically in practice does not turn out to be disadvantageous. Instead of the minimal disadvantage (if there is any) involved, significant advantages arise however with respect to the achievable maximal machining speed of the milling head. This applies in particular also taking into consideration other "side effects", such as—just to give an example—a diameter selected as advantageously as possible for the grinding wheel with which the milling head should be ground (resharpened/relief ground).

It is especially advantageous when the milling head involves a milling head resharpened in a so-called logarithmical and/or profile-constant way. Understood by milling heads resharpened in a profile-constant way or respectively logarithmic milling heads are typically milling heads in which the leading edge angle and/or clearance angle of the milling teeth during a resharpening and/or relief grinding remains (substantially) constant. Thus no milling teeth are used here which have a constant outer diameter. Instead this diameter tapers in circumferential direction (seen counter to the direction of rotation of the milling head) with progressive spacing of the milling tooth cutting edge. Since this change in the diameter is usually based on a logarithmic correlation, such milling heads are often designated as logarithmic milling heads or respectively logarithmically relief-ground milling heads. Such milling heads are generally known in the state of the art and are increasingly widespread. However milling heads of this kind are more complex and costly to produce—the possibility of especially advantageous resharpening and/or relief grinding and the other features of the milling head, as a rule, overly compensate for this disadvantage, however. One advantage of milling heads of this kind is, among others things, that although during the service life of the milling head a resharpening is more often required, owing to tool wear and tear, a relief grinding, owing to the special design, on the other hand, is required considerably less often (if at all), as a general rule. This considerably reduces the maintenance costs. In particular it is also not necessary with milling heads of this kind to change the feed per interval of time when the milling head changes, as a result of wear and tear and/or owing to a resharpening operation and/or a relief grinding operation, or in particular changes with respect to its diameter. Because at least the number of milling teeth and above and beyond this also the leading edge angle, i.e. the angle with which the milling teeth machine the area currently to be machined of the workpiece to be machined, remain (at least substantially) constant, resulting in a (substantially) identical material removal behavior. In other words, the milling head can be operated over its entire lifetime (service life) with substantially similar parameters, such as in particular with a view to rotational speed, feed speed relative to the workpiece, surface quality of the machined workpiece and the like. The advantages thereby involved are obvious.

Furthermore it is proposed that the milling head involved is a form cutter milling head, in particular a form cutter milling head having form constancy, preferably a form-constant resharpened and/or form-constant relief-ground form cutter milling head. Understood by form cutter milling head is typically a milling head which on the workpiece to be machined does not machine any even surface (or if applicable also a <sic.no> curved surface with a constant amount of curvature) but which has a bent surface (if need be, bent multiple times). In particular, in the case of the surface, protrusions and recesses alternate; square edges, rounded edges with if necessary varying curvature radii, grooving, ridge-like protrusions, etc. can be foreseen and differing dimensioning achieved. The conceivable possibilities are almost limitless. A form-constant form cutter milling head is usually referred to when the resulting shaping of the workpiece to be machined does not change, or at least not substantially, with progressive attrition of the form cutter milling head. Generally speaking, this relates to the condition from one resharpening operation to the next resharpening operation (in each case typically after the end of the grinding operation), preferably over at least substantially the entire life of the milling head, if applicable however also over only a portion thereof. It is especially advantageous moreover when involved is a form cutter milling head able to be resharpened in a form-constant way and able to be relief-ground in a form-constant way, such that it can be resharpened once or multiple times without the shaping of the machined workpiece (substantially) changing, in particular from one resharpening operation to the next resharpening operation of the form cutter milling head. As the case may be, it can also prove to be advantageous however when involved as milling head is an unstructured milling head (i.e. a milling head with rectilinear cutting edges).

Furthermore it is proposed that in the case of the milling head, the milling teeth are arranged with substantially the same spacing along the circumference of the milling head. The features of the form cutter milling head can thereby be improved, in particular with respect to the workpiece machining behavior and/or the resharpening behavior and/or the relief grinding behavior. The same can apply moreover, also additionally or alternatively, for the tooth gaps.

Alternatively thereto it is proposed that in the case of the milling head the milling teeth are disposed with a spacing varying with respect to one another along the circumference of the milling head. The features of the form cutter milling head can likewise be thereby improved, in particular with respect to a lesser tendency to vibrate and/or produce noise during the milling operation.

Proposed is that with the proposed formula the value of a is selected between $a=1.7 \cdot 10^{-9}$ and $a=2.3 \cdot 10^{-9}$, preferably between $a=1.8 \cdot 10^{-9}$ and $a=2.2 \cdot 10^{-9}$, especially preferably between $a=1.9 \cdot 10^{-9}$ and $a=2.1 \cdot 10^{-9}$, in particular between $a=1.95 \cdot 10^{-9}$ and $a=2.05 \cdot 10^{-9}$. Initial trials have shown that with values of this kind an especially advantageous milling head can be realized. This can be advantageous to the effect that through a somewhat generous selection of a the milling head can be adapted to certain application conditions and/or to certain materials.

Additionally or alternatively it is possible that in the case of the formula the value of b is selected between $b=-5 \cdot 10^{-7}$ and $b=-11 \cdot 10^{-7}$, preferably between $b=-6 \cdot 10^{-7}$ and $b=-10 \cdot 10^{-7}$, especially preferably between $b=-7 \cdot 10^{-7}$ and $b=-9 \cdot 10^{-7}$, in particular between $b=-7.5 \cdot 10^{-7}$ and $b=-8.5 \cdot 10^{-7}$. Here too what has been said about a applies additionally or alternatively in an analogous way.

Additionally or alternatively it is possible that in the case of the present formula the value of c is selected to be between $c=0.7 \cdot 10^{-4}$ and $c=1.3 \cdot 10^{-4}$, preferably between $c=0.8 \cdot 10^{-4}$ and $c=1.2 \cdot 10^{-4}$, especially preferably between $c=0.9 \cdot 10^{-4}$ and $c=1.1 \cdot 10^{-4}$, in particular between $c=0.95 \cdot 10^{-4}$ and $c=1.05 \cdot 10^{-4}$. Here too what has been said relating to a and/or b applies additionally or alternatively in an analogous way.

Additionally or alternatively it is possible that in the case of the formula being proposed here the value of d is selected between $d=8.5 \cdot 10^{-3}$ and $d=9.7 \cdot 10^{-3}$, preferably between $d=8.7 \cdot 10^{-3}$ and $d=9.5 \cdot 10^{-3}$, especially preferably between $d=8.9 \cdot 10^{-3}$ and $d=9.3 \cdot 10^{-3}$, in particular between $d=9.0 \cdot 10^{-3}$ and $d=9.2 \cdot 10^{-3}$. Also in relation to d what has been said with respect to a and/or b and/or c applies additionally or alternatively in an analogous way.

Additionally or alternatively it is possible, that in the case of the formula being proposed here the value of e is selected between $e=2.6 \cdot 10^{-1}$ and $e=3.7 \cdot 10^{-1}$, preferably between $e=2.8 \cdot 10^{-1}$ and $e=3.5 \cdot 10^{-1}$, especially preferably between $e=3.0 \cdot 10^{-1}$ and $e=3.3 \cdot 10^{-1}$, in particular between $e=3.1 \cdot 10^{-1}$ and $e=3.2 \cdot 10^{-1}$. Here too what has been said relating to a and/or b and/or c and/or d applies additionally or alternatively in an analogous way.

Lastly, it is possible that additionally or alternatively in the case of the formula being proposed here the value of f is selected between $f=-1.5 \cdot 10^{-1}$ and $f=-2.6 \cdot 10^{-1}$, preferably between $f=1.7 \cdot 10^{-1}$ and $f=2.4 \cdot 10^{-1}$, especially preferably between $f=1.9 \cdot 10^{-1}$ and $f=2.2 \cdot 10^{-1}$, in particular between $f=2.0 \cdot 10^{-1}$ and $f=2.1 \cdot 10^{-1}$. Here too what has been said regarding a and/or b and/or c and/or d and/or e applies additionally or alternatively in an analogous way.

In particular the milling head being proposed here is suitable for machining of metals or respectively metallic workpieces. Preferably the milling head is made of hard and/or hardened, metallic material. Use of tungsten carbide and/or cobalt in particular presents itself (in particular as additive). Also the use of diamonds to increase the hardness of the material/increase the service life of the tool is conceivable. Thought of in this connection is in particular PCD (PCD=polycrystalline diamond, a synthetically produced cutting material which has an extremely firmly fused together mass of arbitrarily oriented diamond crystals). Of course additionally or alternatively also the use of so-called cubic boron nitride (CBN) is conceivable. This is a cutting material made of a polycrystalline mass of cubic boron nitride grain, which is sintered under high pressure.

Possible is that the milling head is designed in such a way that the ratio of milling teeth width to width of the tooth gaps situated in between lies in the range of 0.7 to 1.3, preferably from 0.8 to 1.2, especially preferably from 0.9 to 1.1, in particular from 0.95 to 1.05. In particular it is possible that the ratio is substantially 1 (whereby of course certain machining tolerances could arise). Initial trials have shown that with such a dimensioning an especially advantageous milling head can be realized. However values/value ranges diverging (even diverging greatly) from this are in principle conceivable.

Above and beyond this it is possible that the milling head is designed in such a way that the height of the milling teeth (i.e. the profile height) lies in the range of 0.05 to 10 millimeters. In part, other values have proven advantageous, such as, for example, as lower limit 0.06 mm, 0.07 mm, 0.08 mm, 0.09 mm, 0.1 mm, 0.2 mm, 0.3 mm, 0.4 mm, 0.5 mm, 0.6 mm, 0.7 mm, 0.8 mm, 0.9 mm, 1 mm, 1.5 mm, 2 mm, 2.5 mm, 3 mm, 3.5 mm, 4 mm, 4.5 mm or 5 mm and/or as upper limit 6 mm, 7 mm, 8 mm, 9 mm, 11 mm, 12 mm, 13 mm, 14 mm, 15 mm, 20 mm, 25 mm or 30 mm. Such a height of the milling teeth has proven to be especially advantageous in relation to the tool service life with as constant a quality as possible and a continuously high possible number of milling teeth (minimal tooth pitch). The height of the milling teeth can be understood thereby with non-constant teeth (in particular logarithmic milling teeth) as maximal height, minimal height or also (other) interim value (in particular mean value between maximal and minimal value). For definition of the milling head diameter, reference is made to what has already been said. Also in this connection it is to be mentioned that in principle values/value ranges diverging (even diverging greatly) from this are conceivable.

Furthermore it is advantageous if the milling head is designed, set up and dimensioned such that it can be relief ground with a grinding wheel of up to 60 millimeters diameter, in particular it can be relief ground in a form-constant way, whereby the rotational axis of the milling head and the rotational axis of the grinding wheel are aligned substantially parallel to one another. Also other diameter upper limits are conceivable for the grinding wheel, such as, for example, 20 mm, 30 mm, 40 mm, 50 mm, 70 mm, 80 mm, 90 mm or 100 mm. With such dimensioning it is in particular possible to achieve an especially advantageous compromise with respect to number of teeth (tooth pitch), surface quality of the machined workpiece, maximal machining speed, long service life of the milling head, as well as long service life of the grinding wheel. Basically, although use of as large a grinding wheel as possible is desired, it is however not always possible, for the most diverse reasons. A grinding operation with "rotational axes parallel to one another" (relief grinding operation) is carried out, as a rule, in addition to a grinding operation during which the plane of the grinding wheel is guided parallel to the surface of the leading edge of a milling tooth (and thereby the rotational axis of the grinding wheel is situated normal to the surface of the leading edge of a milling tooth (even when the rotational axis does not penetrate through the surface region of the leading edge, but instead leads past it; a grinding of a material wheel thereby takes place in the region of the leading edge). However, it is also possible that a "grinding operation with parallel rotational axes" of this kind is carried out alternatively to a "grinding operation with rotational axis situated normal to the leading edge". It is also conceivable that in certain cases also no "grinding operation with parallel rotational axes" takes place and one limits oneself (at least in part) to a "grinding operation with rotational axis situated normal to the leading edge". The already presented explanations about rotation/tilting/inclination of the rotational axes of milling head and grinding wheel apply in an analogous way also in the present context. It is pointed out again in this connection that in principle values/value ranges diverging (even diverging greatly) from this are conceivable.

BRIEF DESCRIPTION OF THE DRAWINGS

Further details of the invention and in particular example embodiments of the proposed device and of the proposed method will be explained in the following with reference to the attached drawings.

DETAILED DESCRIPTION OF EMBODIMENTS OF THE INVENTION

Figure 1:
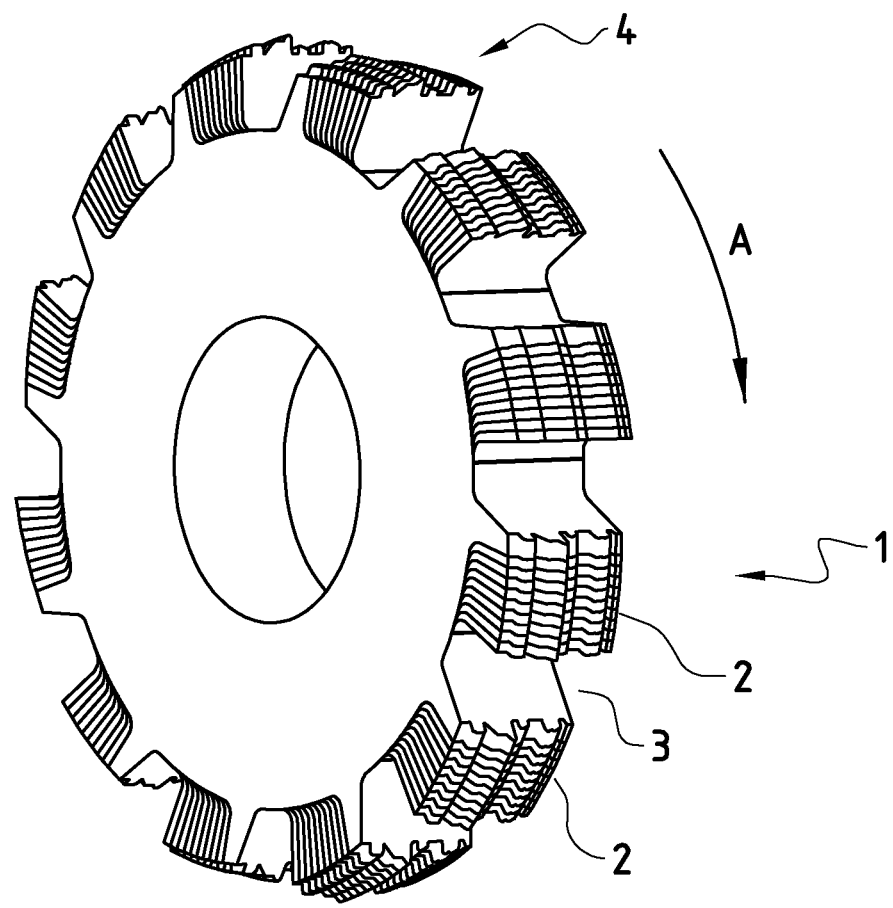
FIG. 1 shows a form cutter milling head 1 in a schematic, perspective view.

To be seen in FIG. 1, in a schematic perspective view, is a form cutter milling head 1. The form cutter milling head 1 serves the purpose of material-removing machining of a workpiece (not shown) to be machined by milling. The surface regions of the workpiece are thereby chipped in a way known per se. For this purpose the form cutter milling head 1 is rotated in direction of arrow A (milling direction or respectively material machining direction).

The form cutter milling head 1 has a greater number of in the present case asymmetrically shaped milling teeth 2. These are shaped in such a way that a so-called logarithmic milling head is formed, which will be gone into more closely later.

Provided between each two milling teeth 2 situated adjacent to one another is a tooth gap 3.

The reason for the term form cutter milling head 1 (or respectively form milling tooth 2) is that the surface 4 of the milling teeth 2 turned toward the workpiece has a structuring. It is thereby possible for the workpiece to be machined to be shaped with a certain surface structuring as a result of the milling. The relationships are also to be seen in FIG. 2, which shows a detail of the form cutter milling head 1 shown in FIG. 1, likewise in a schematic, perspective view.

Figure 4:
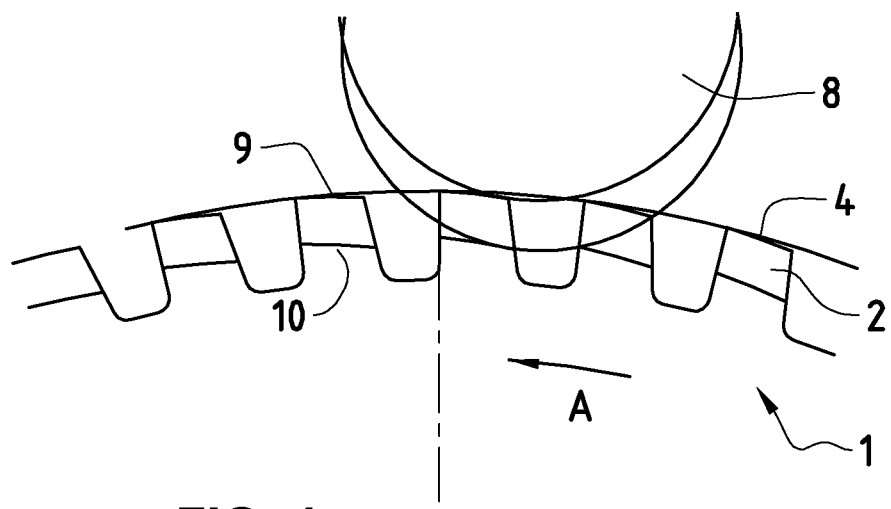
FIG. 4 shows a schematic lateral view of the tooth region of a form cutter milling head during a relief grinding operation.
Figure 5:
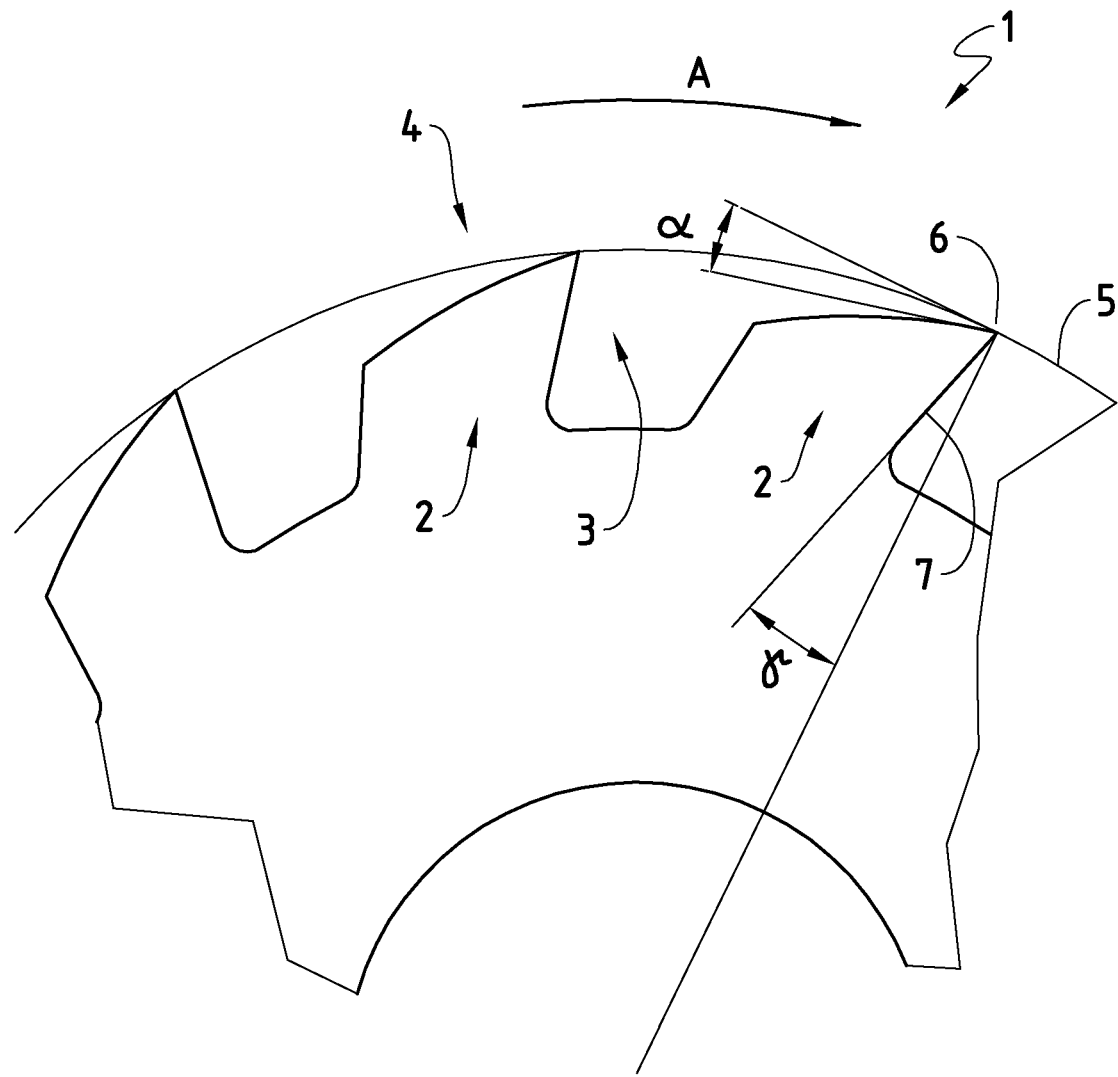
FIG. 5 shows an enlarged detail of the tooth region of a logarithmic form cutter milling head in a schematic side view from above for explanation of various terms.

Represented in FIG. 5 are in addition the relationships of a detail of a form cutter milling head 1 in a side view from above. The line 5 thereby represents a circumference line about the central point of the form cutter milling head 1. It can thereby be seen very well in FIG. 4 that the milling teeth 2 are not symmetrically designed. Instead these teeth have a face with a cutting edge region 6, whereby the cutting edge 6 forms the transition between surface 4 of the milling tooth 2 and its leading edge 7 (face) during rotation of the form cutter milling head 1 in direction of arrow A (machining direction). During a machining operation, the tangent line to the circumference line 5 (at the cutting edge 6) would correspond to the surface of the workpiece to be machined. Accordingly the angle between tooth leading edge 7 and circumference line 5 at the cutting edge 6 constitutes the tooth face angle γ during the workpiece machining.

In the rear in machining direction (towards the left as seen in FIG. 5) the milling tooth 2 tapers so that an increasing spacing arises between surface 4 of the milling tooth 2 and circumference line 5. The angle between the tangent line to the circumference line 5 and the tangent line to the surface 4 at the cutting edge 6 forms the so-called clearance angle α. In the present case, the surface 4 of the milling teeth 2 is designed to be planar; the surface 4 of the milling teeth 2 thus forms a kind of "oblique plane". However it is also conceivable that the surface 4 of the milling teeth 2 is not designed to be planar and for instance is designed as a slightly convex surface disposed in a sloping way ("bump-like").

If the form cutter milling head 1 is used for material machining, it is exposed of course to a certain wear and tear, which is concentrated in the region of the cutting edge 6. Accordingly here too a material removal on the milling head 1, i.e. in particular on the milling tooth 2, will occur to a certain extent. The cutting edge 6 thereby deforms over time, changing from a sharp edge (with a defined "true edge") to a "rounded" (and thereby dull or blunt) edge. Consequently the form cutter milling head 1 becomes dull or blunt over time. Its cutting capability thereby decreases. Above and beyond this, the surface machined by the form cutter milling head 1 has a deteriorated quality.

Figure 2:
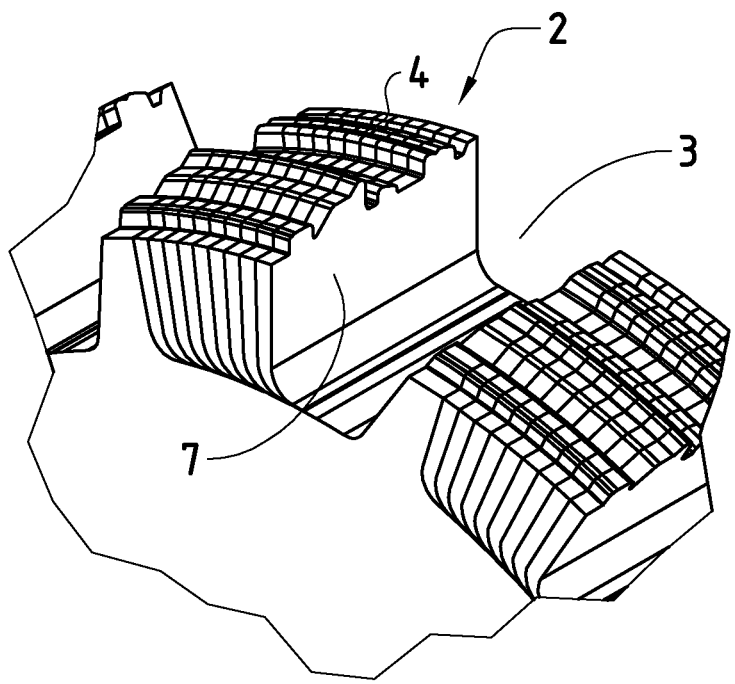
FIG. 2 shows, in a schematic, perspective view, an enlarged detail of the form cutter milling head shown in FIG. 1.

To restore the quality of the milling operation, it is therefore necessary to resharpen the form cutter milling head 1 so that there is once again a sharp cutting edge 6 (with a "true edge") of the milling teeth 2. This takes place through a so-called resharpening operation, i.e. a grinding operation in the region of the face of the milling tooth 2 (seen in milling direction A). A portion of the leading edge 7 (a kind of "slice") is thereby removed. Used for this purpose, as a rule, is a grinding wheel, in particular a pointed profile grinding wheel 8. Indicated schematically in FIG. 2 is how the form cutter milling head 1 can be ground down in the region of the tooth leading edge 7 multiple times in a stepwise ("slice-wise") fashion in the course of its lifetime cycle.

Depending upon the amount of attrition of the form cutter milling head 1, it can also prove necessary to carry out a combined resharpening operation and relief grinding operation. Typically such a combined resharpening and relief grinding operation is needed after several "purely resharpening operations". The combined resharpening operation/relief grinding operation typically takes place in two steps. Thereby, on one hand, (typically as first step) the above-described resharpening operation is carried out, i.e. the face of the milling tooth 2 (seen in milling direction A) is ground.

This stepwise (slice-wise) material removal in the region of the tooth leading edge 7 "alone" can however prove to be no longer sufficient, especially with form cutter milling heads, after longer use. In such a case it is additionally necessary that the surface structuring of the surface 4 of the milling teeth 2 be "renewed" by means of a grinding operation. For this purpose it has proven to be reliable, especially with form cutter milling heads 1, when in a second grinding step (the relief grinding step) a so-called pointed profile grinding wheel 8 is used for relief grinding of the surfaces 4 of the milling teeth 2. This is shown schematically in FIG. 3. A milling tooth 2 in cross section is to be discerned here (cross section is normal to the direction of movement of the milling tooth 2 during milling operation of the form cutter milling head 1; i.e. the material machining direction). On the surface 4 of the milling tooth 2 (turned toward the workpiece to be machined), the surface structuring of the same is to be discerned in the form of a number of differently formed ridges 9 and depressions 10. The relief grinding operation takes place with a pointed profile grinding wheel 8, whose protruding edge has a sufficiently small width so that the surface structuring of the surface 4 of the milling tooth 2 can be formed. For carrying out the relief grinding operation, the pointed profile grinding wheel 8 must be moved with a suitable movement pattern laterally back and forth as well as up and down in height. Above and beyond this, it also makes sense, as a rule, when the rotational axis 11 of the pointed profile grinding wheel 8 is inclined in relation to the rotational axis of the form cutter milling head 1. In particular the edge regions of the grooves or depressions 10 are to be formed better, as a rule, through such a tilting/inclining of the pointed profile grinding wheel 8 relative to the form cutter milling head 1.

Figure 3:
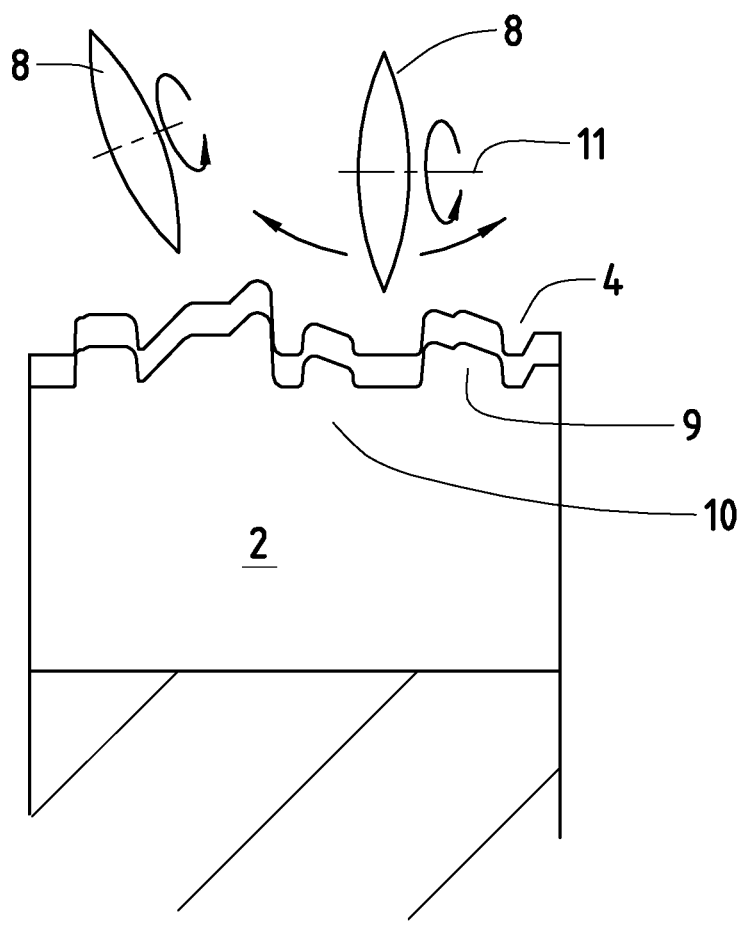
FIG. 3 shows a schematic cross section through the tooth region of a form cutter milling head perpendicular to the material machining direction of the form cutter milling head.

In additional to FIG. 3, the relief grinding operation is also represented in FIG. 4, here seen in a schematic lateral view from above. To make the operation clear, furthermore two different profile lines/profile points of the form cutter milling head 1 are represented, namely a ridge 9 as well as a depression 10. The radially outer line represents a ridge 9 along the shaped profile of the form cutter milling head 1, while the radially inner line shows a depression or groove 10 along the shaped profile of the form cutter milling head 1. To indicate that the relief grinding operation "works" both in the region of a ridge 9 as well as in a region of a groove or depression 10 of the form cutter milling head 1; the pointed profile grinding wheel 8 has been drawn in double (i.e. in different positions).

The individual resharpening and/or relief grinding cycles are of course spaced apart from one another in time. Between two resharpening and/or relief grinding operations, the form cutter milling head 1 is usually used for milling workpieces to be machined.

For the sake of completeness, it is pointed out that, in the case of the form cutter milling head shown in FIG. 3, the milling direction A diverges from that of the other figures.

Based on the logarithmic outer profile of the form cutter milling head 1, a resharpening operation or respectively relief grinding operation can be carried out substantially over the entire service life (and thereby with different amounts of attrition of the form cutter milling head 1), whereby the same pointed profile grinding wheel 8 can always be used. Typically over the entire service life of the form cutter milling head 1, the number of "exclusively resharpening steps" (material removal in the region of the tooth leading edge) will be greater than the number of "combined resharpening and relief grinding operations" (both on the tooth leading edge 7 as well as also on the surface 4 of the milling teeth 2).

Of course the described resharpening and relief grinding steps are to be carried out in a similar way during production of the form cutter milling head 1.

So that with the finished form cutter milling head 1 as high a machining speed as possible can be achieved (relative feed speed between form cutter milling head 1 and workpiece), as great as possible a number of milling teeth is to be provided, or respectively, seen in circumferential direction of the form cutter milling head 1, as minimal as possible spacing between two milling teeth 2 situated adjacent one another (minimal tooth pitch) because in this case, with a single rotation of the form cutter milling head 1, a greater number of material removal operations occur (a greater number of cutting edges 6 run past the workpiece to be machined).

However, the number of teeth in practice is also limited upwardly (at least for reasons of practicality) (even if usually without sharp limits), since the dimensions of the tooth gaps 3 would be so small that the grinding operation in the region of the tooth leading edge 7 of the respective milling teeth 2 would have to be carried out with too delicate a workpiece (pointed profile grinding wheel 8) (cf. FIG. 2). Also the number of grinding steps to be carried out would increase much too greatly, which would take correspondingly long.

For this reason, it makes sense to find a compromise as advantageous as possible. This results when the tooth pitch of the form cutter milling head 1 (spacing of two milling teeth 2 situated adjacent one another along the circumference of the form cutter milling head 1) as a function of the diameter of the form cutter milling head 1 complies substantially with the equation $y = a \cdot x^5 + b \cdot x^4 + c \cdot x^3 + d \cdot x^2 + e \cdot x + f$ and/or the tooth pitch of the milling head 1 is selected to be lesser than the tooth pitch determined in such a way. In an advantageous way the coefficients a, b, c, d, e and f of the fifth-degree polynomial are thereby selected with the values $a = 2 \cdot 10^{-9}$, $b = -8 \cdot 10^{-7}$, $c = 1 \cdot 10^{-4}$, $d = 9.1 \cdot 10^{-3}$, $e = 3.145 \cdot 10^{-1}$ and $f = -2.062 \cdot 10^{-1}$. The number of teeth of the form cutter milling head 1 results (with units selected in a way suitable to one another) through division of the circumference of the form cutter milling head 1 by the value of the tooth pitch (spacing of two milling teeth situated adjacent to one another). Thus it applies that $N = U/A$ with N as the number of milling teeth 2, U as the circumference of the form cutter milling head 1 and y as the tooth pitch, whereby, as is known, the circumference can be calculated from the radius r (or respectively the diameter d) by means of the equation $U=2\pi r=\pi d$.

For the case where there results, with predefined diameter d of the milling head 1, a non-integer value N for milling teeth 2, it is possible to round up, round down, or round according to commercial practice the number of teeth ("limit tooth number").

It is however advantageous when, after the rounding of the tooth number of the form cutter milling head 1, the rounded, determined number of teeth 2 for the form cutter milling head 1 (after its conversion to the tooth pitch y) is put into the said formula as input parameter, and, based on the rounded number of teeth, the optimal diameter of the form cutter milling head 1 is calculated (which is possible without any problem especially using numerical solution methods). The instances of divergence of the diameter with respect to the "desired diameter" typically lie in the range of a few millimeters. Thereby accompanying disadvantageous effects are, as a rule, negligible. It is to be pointed out moreover that the diameter of a form cutter milling head 1 (or another such milling head) changes anyway in the course of its life cycle as a result of attrition and/or resharpening operations and/or relief grinding operations, and thus a certain divergence from the "desired diameter" will occur in any case.

What is claimed is:

1. A form cutter milling head with a plurality of machining milling teeth and tooth gaps arranged there-between, which are arranged along a circumferential surface of the form cutter milling head, wherein an actual number of said milling teeth is greater than or equal to a calculated number of milling teeth ascertained from the relationship $n=C/y$ wherein n is the number of milling teeth, y is a tooth pitch of the form cutter milling head defined as a distance in millimeters between two said milling teeth situated adjacent to one another, and C is a circumference in millimeters of the form cutter milling head, wherein the tooth pitch relates to a diameter of the form cutter milling head via a fifth-order polynomial of the form $y=a\cdot x^5+b\cdot x^4+c\cdot x^3+d\cdot x^2+e\cdot x+f$, wherein x is the diameter of the milling head in millimeters, y is the aforesaid tooth pitch in millimeters, and a, b, c, d, e, and f are coefficients of the fifth-order polynomial.

2. The form cutter milling head according to claim 1, wherein a tooth face angle ($\gamma$) and/or a clearance angle ($\alpha$) of the milling teeth remains constant with a resharpening and/or relief grinding of the milling teeth.

3. The form cutter milling head according to claim 1, said form cutter milling head having form constancy with a profile-constant or logarithmic relief-ground surface.

4. The form cutter milling head according to claim 1, wherein the milling teeth are arranged with constant spacing along the circumference of the milling head.

5. The form cutter milling head according to claim 1, wherein the milling teeth are disposed with a spacing varying with respect to one another along the circumference of the milling head.

6. The milling head according to claim 1, wherein the value of a ranges between $a=1.8\cdot 10^{-9}$ and $a=2.2\cdot 10^{-9}$.

7. The milling head according to claim 1, wherein the value of b ranges between $b=-6\cdot 10^{-7}$ and $b=-10\cdot 10^{-7}$.

8. The milling head according to claim 1, wherein the value of c ranges between $c=0.8\cdot 10^{-4}$ and $c=1.2\cdot 10^{-4}$.

9. The milling head according to claim 1, wherein the value of d ranges between $d=8.7\cdot 10^{-3}$ and $d=9.5\cdot 10^{-3}$.

10. The milling head according to claim 1, wherein the value of e ranges between $e=2.8\cdot 10^{-1}$ and $e=3.5\cdot 10^{-1}$.

11. The milling head according to claim 1, wherein the value of f ranges between $f=-1.7\cdot 10^{-1}$ and $f=-2.4\cdot 10^{-1}$.

12. The milling head according to claim 6, wherein the value of a ranges between $a=1.9\cdot 10^{-9}$ and $a=2.1\cdot 10^{-9}$.

13. The milling head according to claim 7, wherein the value of b ranges between $b=-7\cdot 10^{-7}$ and $b=-9\cdot 10^{-7}$.

14. The milling head according to claim 8, wherein the value of c ranges between $c=0.9\cdot 10^{-4}$ and $c=1.1\cdot 10^{-4}$.

15. The milling head according to claim 9, wherein the value of d ranges between $d=8.9\cdot 10^{-3}$ and $d=9.3\cdot 10^{-3}$.

16. The milling head according to claim 10, wherein the value of e ranges between $e=3.0\cdot 10^{-1}$ and $e=3.3\cdot 10^{-1}$.

17. The milling head according to claim 11, wherein the value of f ranges between $f=-1.9\cdot 10^{-1}$ and $f=-2.2\cdot 10^{-1}$.

* * * * *